United States Patent
Duraiswamy et al.

(10) Patent No.: US 11,330,346 B1
(45) Date of Patent: May 10, 2022

(54) POPULARITY MEASURES FOR VIEWER-GENERATED STREAM CLIPS

(71) Applicant: Amazon Technologies, Inc., Seattle, WA (US)

(72) Inventors: Vijay Jayaraman Duraiswamy, Bothell, WA (US); Mario V. Adoc, Seattle, WA (US); Ryan Peter Reid, Seattle, WA (US); Rose Jia, New York, NY (US); Justin Taylor Manners, Davis, CA (US)

(73) Assignee: Amazon Technologies, Inc., Seattle, WA (US)

( * ) Notice: Subject to any disclaimer, the term of this patent is extended or adjusted under 35 U.S.C. 154(b) by 384 days.

(21) Appl. No.: 16/441,823

(22) Filed: Jun. 14, 2019

(51) Int. Cl.
| | |
|---|---|
| *H04N 21/84* | (2011.01) |
| *H04H 60/29* | (2008.01) |
| *H04N 21/231* | (2011.01) |
| *H04N 21/432* | (2011.01) |
| *H04N 21/482* | (2011.01) |
| *H04N 21/47* | (2011.01) |

(52) U.S. Cl.
CPC ............ *H04N 21/84* (2013.01); *H04H 60/29* (2013.01); *H04N 21/231* (2013.01); *H04N 21/432* (2013.01); *H04N 21/47* (2013.01); *H04N 21/482* (2013.01)

(58) Field of Classification Search
CPC .... H04N 21/84; H04N 21/231; H04N 21/432; H04N 21/482; H04N 21/47; H04H 60/29
See application file for complete search history.

(56) References Cited

U.S. PATENT DOCUMENTS

| | | |
|---|---|---|
| 9,873,040 B1 | 1/2018 | Kim et al. |
| 10,532,290 B2 | 1/2020 | Miura et al. |
| 10,722,801 B1 | 7/2020 | Curley et al. |
| 2008/0243853 A1 | 10/2008 | Reding et al. |
| 2009/0075738 A1 | 3/2009 | Pearce |
| 2009/0131177 A1 | 5/2009 | Pearce |
| 2009/0209335 A1 | 8/2009 | Pearce |
| 2011/0207526 A1 | 8/2011 | Kamano |
| 2017/0034583 A1* | 2/2017 | Long .................... H04N 21/632 |
| 2017/0311035 A1* | 10/2017 | Lewis ............. H04N 21/25891 |
| 2018/0117477 A1* | 5/2018 | Miura ...................... A63F 13/12 |
| 2019/0052939 A1* | 2/2019 | Wang .................... H04L 9/3236 |

* cited by examiner

*Primary Examiner* — Oschta I Montoya
(74) *Attorney, Agent, or Firm* — BakerHostetler

(57) ABSTRACT

Viewers of a video stream may generate video clips including different portions of the video stream. Popularity measures may be computed for the video clips, for example based on tracked actions associated with the video clips, such as frequency of playing and sharing of the video clips. The popularity measures may be used to select and provide video clips to viewers. Video items may be generated by streamers, such as may include selected portions of video of streamers playing a game. A video item generated by a particular streamer may be displayed to viewers only during times when that particular streamer is participating in an active game session. Viewers of the video item may provide input that allows viewers to receive a live stream of the streamer's active game session that it is being played simultaneously with the display of the video item.

18 Claims, 11 Drawing Sheets

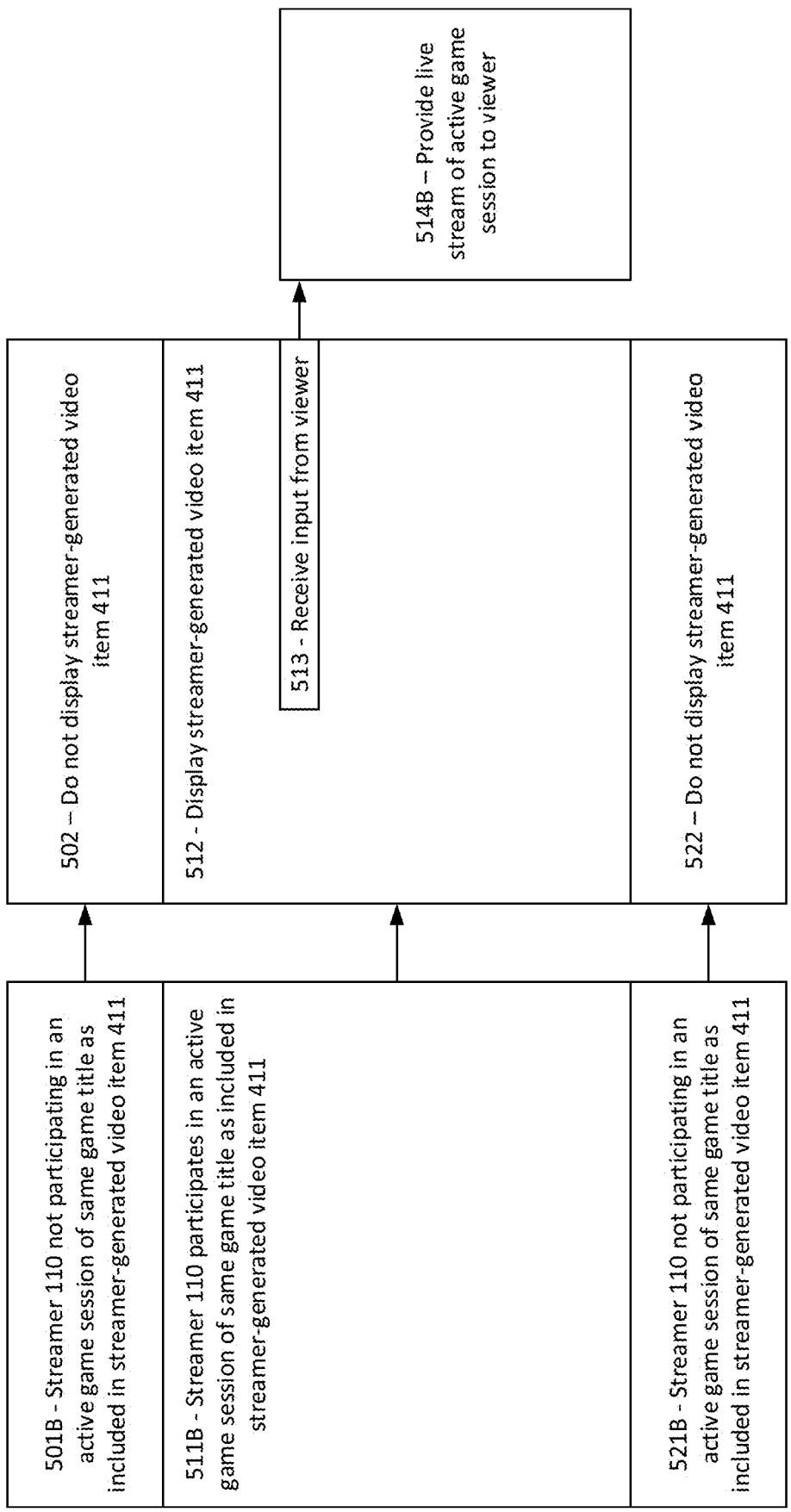

POPULARITY MEASURES FOR VIEWER-GENERATED STREAM CLIPS

CROSS-REFERENCE TO RELATED APPLICATIONS

This application is related to the following application, which is hereby incorporated by reference in its entirety: U.S. patent application Ser. No. 16/442,018 filed Jun. 14, 2019, entitled "STREAMER-GENERATED VIDEO ITEMS FROM GAME SESSIONS".

BACKGROUND

The widespread use of video streaming has increased rapidly in recent years. A streamer, as used herein, refers to a user that provides video content that is streamed to viewers. In some examples, a streamer may capture video content and transmit the video content to a video streaming service. The video streaming service may then, in turn, transmit the video to a number of viewers. In one specific example, a streamer may be a video game player that captures and transmits video of a game that he or she is playing. In some examples, the video content may be transmitted to viewers and played using live streaming techniques. For example, content video of an event (e.g., video game) may be transmitted to viewers, and at least part of the video content may be played while the event is still occurring (e.g., while the video game is still being played by the streamer), albeit with some small amounts latency between the time that video content is captured by the provider and the time that the video is eventually played to viewers. In some examples, streamers, such as video game players, may wish to accumulate large numbers of viewers, such as to enhance their reputations and recognition in a gaming or other streaming community. Moreover, in some examples, publishers of games or other content that are used by streamers may benefit from having streamers accumulate large number of viewers, such as by gaining additional exposure and publicity for their content. In some examples, viewers of the video content may generate clips of different portions of the transmitted video content. These clips may, in turn, be viewed and shared amongst any number of other viewers, thereby allowing streamers to grow their fan bases through social sharing.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 5A-5B are diagrams illustrating example intelligent timing control of streamer-generated video items that may be used in accordance with the present disclosure.

DETAILED DESCRIPTION

Figure 1:
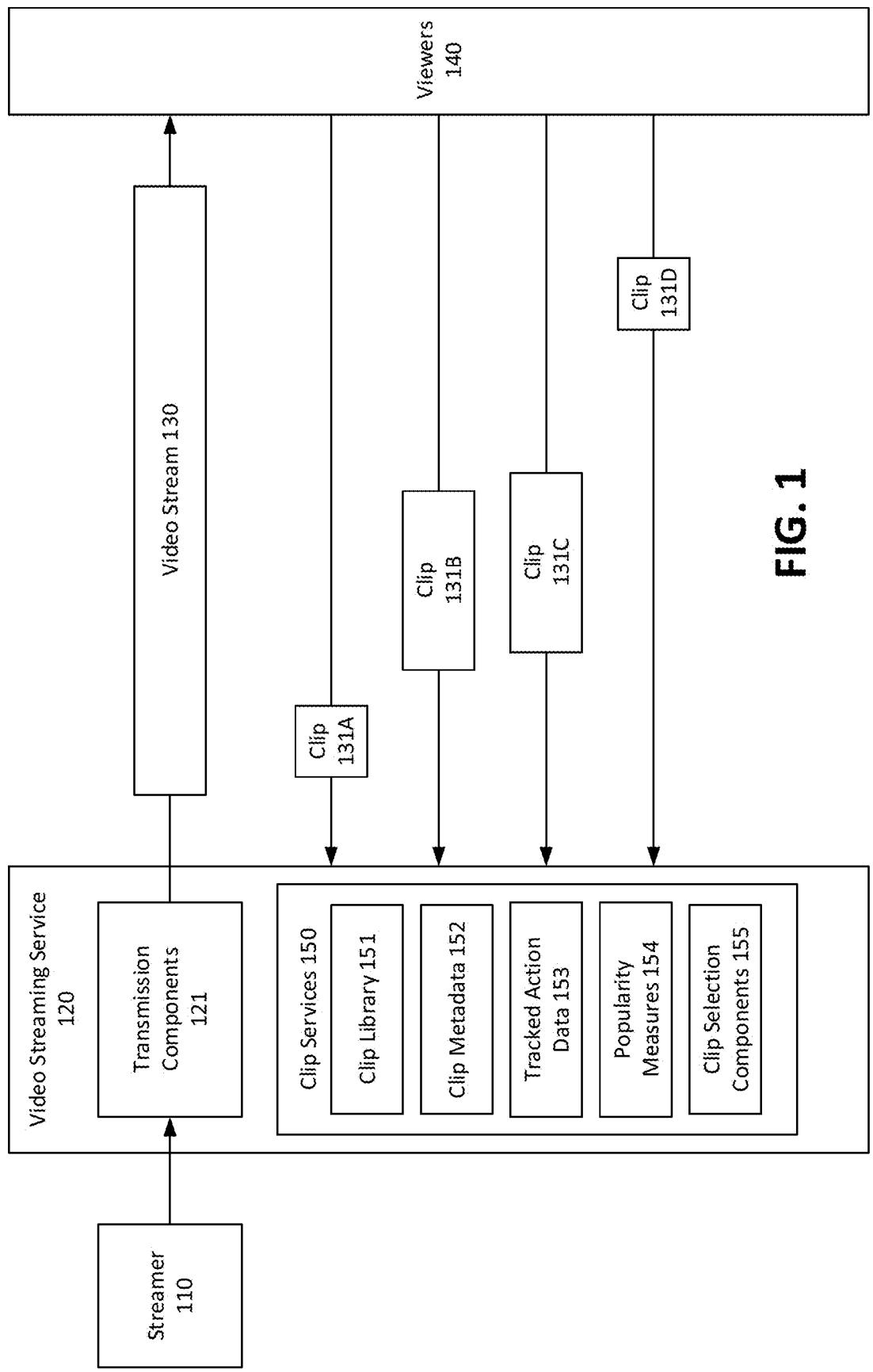
FIG. 1 is a diagram illustrating an example video clip popularity measuring system that may be used in accordance with the present disclosure.

Various techniques relating to viewer-generated stream clips and streamer-generated video items are described herein. In particular, in some examples, a stream of video content, for example corresponding to a video game, may be transmitted to a number of viewers. The video content may be provided by a streamer, which is user that provides video content that is streamed to viewers. In some examples, the streamer may transmit the video content to a video streaming service. The video streaming service may then, in turn, transmit the video content to a number of viewers. For example, a streamer may be a video game player that captures and transmits video of a game that he or she is playing. The video streaming service may, in turn, transmit the video of the game to a number of viewers. In some examples, the video content may be transmitted to viewers and played using live streaming techniques. For example, video content of an event (e.g., video game) may be transmitted to viewers, and at least part of the video content may be played while the event is still occurring (e.g., while the video game is still being played by the streamer), albeit with some small amounts latency between the time that video content is captured by the provider and the time that the video is eventually played to viewers.

In some examples, viewers of a video stream may generate a number of video stream clips including recordings of different portions of the video stream. These clips may, in turn, be viewed and shared amongst any number of other viewers. In some examples, certain clips may be particularly desirable for viewers. For example, in some cases, the most frequently viewed and shared video clips may be desirable, as the frequent viewing and sharing of these clips suggests that they include video that is enjoyable and/or interesting to large numbers of viewers. However, it is currently difficult for clip viewers to determine which clips are the most desirable to view. In particular, a video streaming service may sometimes transmit large quantities of video streams, each with large quantities of respective stream clips, thereby creating a large pool of available stream clips. Moreover, information about the available stream clips is often limited, leaving viewers with no efficient way to determine which of the many available clips are most suitable for them.

As described herein, in some examples, a video streaming service may compute popularity measures for available video clips. Each popularity measure may indicate a respective popularity of a corresponding video clip. For example, in some cases, the popularity measures may include popularity scores that are a function of, or otherwise related to, popularity, such as with more popular clips having higher scores and less popular clips having lower scores. In some examples, the video streaming service may track various actions associated with each video clip. The tracked actions may include actions such as playing of a video clip, sharing of a video clip, submission of comments (including text, chat, audio, icons, graphics, emotes, likes, etc.) associated with the video clip, and the like. The video streaming service may collect and store data indicative of the tracked actions and associated information, such as times at which the actions occurred, associated users, related actions or events, and the like. The tracked actions may then be used to determine the popularity measures. For example, in some cases, a popularity measure may be determined based at least in part on a frequency (i.e., amount divided by time) with which a respective video clip is played and/or shared within one or more time periods, such as a previous hour, day or week. Also, in some examples, a popularity measure may be determined based at least in part on an amount and/or frequency of comments submitted in association with a respective video clip. In addition to tracked actions, the popularity measure may also be based on other factors, such as a quantity of viewers or other characteristics of a streamer that provided the video from which the video clip was generated. Moreover, in some examples, popularity measures may be weighted, for example to give priority (e.g., a higher score) to clips that have certain desired characteristics, such as clips that show certain game titles and/or game features, clips show certain features of the video streaming service (e.g. technical features/options that the video streaming service wishes to publicize or raise awareness of), and the like.

The popularity measures may be used to select and provide video clips to viewers. In some examples, video clips may also be selected for viewers based on other factors, such as contents and/or characteristics of the video clips. For example, in some cases, video clip requestors may specify preferred game titles and/or streamers from which to provide video clips. Also, in some examples, video clip creators may provide keywords, a representative thumbnail image, and/or other information that describes or otherwise relates to the contents of the video clips. In some examples, the keywords may describe various emotions or contexts of the clips, such as happy, sad, exciting, dangerous, attractive, calm, violent, expert, winning, losing, turning point, and the like. These emotions or contexts may be matched to desired emotions or contexts that a user may specify, such as when requesting or searching for desired video clips. Also, in some examples, emotions and or contexts of a video clip may be determined based on other information, such as chat, emotes and other comments associated with the video clip, the representative thumbnail image, and the like. Any combination of image, speech/audio, text or other data recognition analyses may be performed on comments, representative thumbnails and/or other data associated with the video clips, as well as the video clips themselves, to determine emotions or contexts associated with the video clips.

In some examples, some of the available video clips may include a common portion of a video stream from which they are generated, thereby wholly or partially overlapping one another. In some cases, when it is determined that two or more clips overlap one another, such as by a threshold amount and/or percentage of time, the collected data associated with those clips may be merged or otherwise combined. For example, consider a scenario in which a first and a second video clip substantially overlap one another such that they mostly include identical portions of a video stream. Now suppose that the first video clip has received ten-thousand views in the last hour, while the second video clip has received only five views in the last hour. In this scenario, because these video clips include substantially the same content, it may be presumed that the low frequency of the viewing of the second video clip (in comparison to the much higher frequency of the viewing of the first video clip) is primarily due merely to a lack of awareness or publicity of the second video clip in the viewing community. Thus, in some examples, although the second video clip did not have high viewership, the viewership data for the first and second clip may be merged such that the higher viewership of the first video clip is also attributed to the second video clip, thereby potentially resulting in a much higher popularity score for the second video clip than if its viewership data had not been merged with the first video clip. Also, in some examples, other data regarding the first and second video clips may also be merged, such as keywords and other emotion or context data, chat, emote and other comment data, and the like.

Thus, popularity measures and other video clip selection techniques may provide a number of advantages. For example, these techniques may allow users of the video streaming service to discover additional streamers, thereby enhancing the user's experience, encouraging greater use of the video streaming service, and further promoting the streamer to additional viewers. Additionally, the popularity measures may allow creators of popular video clips to be recognized and rewarded, thereby incentivizing them to continue to generate popular clips and to further engage with the video streaming service. Furthermore, popular video clips may often showcase particular features of the video streaming service, thereby allowing additional exposure of these features and encouraging their use by viewers.

In some examples, one or more video clips may be included in a video item that may be provided to viewers. For example, in some cases, a video item may include a daily, weekly or other highlight reel of popular video clips for a particular streamer and/or game title, in some cases tailored to particular emotions or other contexts that may be desired by a particular viewer. In addition to video clips, a video item may also include secondary content, such as advertisements, notifications and the like, thereby providing additional incentive to the streaming service to provide the video items to viewers. Also, in some examples, when a video item is viewed, the creators of the video clips that are included in the viewed content item may receive a return from the video streaming service, such as a reward or recognition from the video streaming service. This may provide a further incentive for viewers to benefit from generation of video clips.

As also described herein, in some examples, video items may be generated by streamers, such as may include selected portions of video of streamers playing particular game titles. Specifically, in some examples, a streamer may be a video game player and may participate in a first video game session for a particular game title. Video content may be captured and recorded that includes video of the first video game session. In some examples, in addition to only game video, the captured video content may include video of the streamer, such as video of the streamer's face while participating in the first game session, as well as potentially corresponding game audio and audio of the streamer speaking and commenting on game action. In some examples, the streamer's participation in the first video game session may be part of a campaign or program where the streamer is incentivized to play the particular game title in order to generate publicity and interest in the particular game title. Upon completion of the first video game session, the streamer may select a desired portion (e.g., 5, 15 or 30 second portions or other durations) of the video content of the first video game session for inclusion in a streamer-generated video item. In some examples, the streamer may select the desired portion based on the popularity measures described above, such as by selecting a portion of the video content that is included in a clip with a high popularity score. The high popularity score of such a clip may suggest that the respective portion of the video content includes video that is interesting and exciting to viewers. In some examples, upon selection of the video content portion, the video content portion may pass through an approval process, such as whereby a publisher of the video game title, the video streaming service, and potentially other entities may be permitted to review and approve or reject the video content portion, for example to allow these entities to ensure brand safety and for other reasons. The selected video content portion may then be included in a streamer-generated video item.

The streamer-generated video item may be played to viewers through various contexts. For example, the video item may be played to viewers in association with (e.g., as a pre-roll and/or post-roll) other video streams of other streamers playing the same game title that is included in the video item. As another example, the video item may be played on a directory page for game title that may be provided by the video streaming service. As yet another example, the video item may be played on selected external (i.e., non-video streaming service) websites.

In some examples, a video item generated by a particular streamer may be displayed to viewers only during times when that particular streamer is participating in an active game session—and, in some cases, only when participating in an active game session of the same video game title that is included in the video item. Moreover, in some examples, the streamer's participation in an active game session may be detected dynamically by the video streaming service, thereby allowing the streamer the flexibility to start and stop playing at any time and not requiring that the streamer to play only in specific reserved or other pre-arranged time periods. Additionally, in some examples, viewers of the video item may provide input (e.g. right-click, etc.) that allows viewers to request to receive a live stream of the streamer's active game session that it is being played simultaneously with the display of the video item. For example, the video item may be displayed in combination with a control that receives a viewer's input and responsively triggers transmission of the live stream of the streamer's active game session to the viewer. Thus, by allowing viewers to access a live stream of the streamer, the streamer-generated video item may allow efficient targeting and linkage of viewers with streamers and game titles. This may benefit viewers, such as by allowing viewers to easily discover additional streamers and/or game titles that may be of interest to the viewers. Additionally, this may benefit streamers, such as by allowing streamers to build their fan bases and attract larger amounts of viewers. Furthermore, this may benefit game publishers, such as by allowing game publishers to gain additional exposure and publicity for their games. Also, this may benefit the video streaming service, such as by allowing the video streaming service to raise awareness of streamers and game titles carried by the service and to potentially gain a return from game publishers in exchange for showing streamer-generated video items that showcase their games. Moreover, by showing streamer-generated video items only when respective streamers are actively streaming a live game session, the video items are intelligently targeted to live streamers, thereby enhancing the level of interaction between viewers and the streamers to which they are introduced and linked.

In some examples, when a viewer is linked to a streamer via a streamer-generated video item, the streamer may be given a return when a viewer acquires an executable instance of the video game title that is shown in the video item and the live stream to which the viewer is linked. For example, in some cases, the live stream may be displayed in combination with a control that allows the viewer to acquire the game title, such as by linking the viewer to a purchase page for the game title. In other examples, the viewer's acquisition of game title may be tied to the streamer in other ways, such as by acquiring the game title within a specified time period of viewing the streamer play the game title, by having the viewer enter an identifier or promotional code associated with the streamer when acquiring the game title, or in other ways. In this way, the streamer may be further incentivized to create video items and to play and publicize a game title.

Referring now to FIG. 1, an example video clip popularity measuring system will now be described in detail. In particular, as shown in FIG. 1, a video stream 130 may be transmitted from a streamer 110 to a video streaming service 120, which, in turn, may transmit the video content to a number of viewers 140. The video stream 130 may be transmitted from streamer 110 to video streaming service 120 and, in turn, from video streaming service 120 to viewers 140 over one or more communications networks, for example one or more local area networks (LAN's) and/or one or more wide area networks (WAN's), such as the Internet. Additionally, video stream 130 may be transmitted from streamer 110 to video streaming service 120 and, in turn, from video streaming service 120 to viewers 140 using streaming transmission techniques, in which portions of transmitted content are received and played while subsequent portions of the transmitted content are being transmitted. A video stream, as used herein, refers to video content that is transmitted using streaming transmission techniques. Video streaming service 120 includes transmission components 121, such as encoders, edge servers, and the like.

In some examples, the video stream 130 may include video of a live event, such as a video game, sporting event, news event, or other live event. In one specific example, streamer 110 may be a video game player and may provide video captured from a video game that he or she is playing. In some examples, in addition to only game video, the video stream 130 may include or be combined with video of streamer 110, such as video of the streamer's face while playing a game, as well as corresponding game audio, audio of the streamer 110 speaking and commenting on game action, and other additional video and audio. In some examples, the video stream 130 may be transmitted to a video player and played using live streaming techniques. For example, a video stream 130 of an event (e.g., a video game) may be transmitted to a video player, and at least part of the video content item 100 may played by the video player while the event is still occurring (e.g., while the video game is still being played by one or more game players), albeit with some small amounts of latency between the time that the video is captured by the streamer 110 and the time that the video is eventually played for viewers 140. In some examples, streamer 110 may capture video using screen capture software, one or more cameras, and/or other video capture components.

As shown in FIG. 1, viewers 140 may generate viewer clips 131A-D including recordings of different portions of the video stream 130. As should be appreciated, although FIG. 1 shows four clips 131A-D, any number of different clips of the same or different durations covering the same or different portions of a video stream may be generated in accordance with the techniques described herein. The clips 131A-D may be viewed and shared amongst viewers 140 of video stream 130 as well as other viewers. In the example of FIG. 1, video streaming service 120 includes clip services 150, which manages video clips created by viewers of the video streaming service, including clips 131A-D. In particular, in this example, clip services 150 includes a clip library 151 that may store created and submitted clips, including clips 131A-D.

Clip services 150 may also include clip metadata 152, which may include data that describes the clips stored in the clip library 151. For example, in some cases, video clip creators may provide keywords, a representative thumbnail image, and/or other information that describes or otherwise relates to the contents of the video clips. In some examples, the keywords may describe various emotions or contexts of the clips, such as happy, sad, exciting, dangerous, attractive, calm, violent, expert, winning, losing, turning point, and the like. Also, in some examples, emotions and or contexts of a video clip may be determined based on other information, such as chat, emotes and other comments associated with the video clip, the representative thumbnail image, and the like. Any combination of image, speech/audio, text or other data recognition analyses may be performed on comments, representative thumbnails and/or other data associated with the video clips, as well as the video clips themselves, to determine emotions or contexts associated with the video clips. This emotion or context information and other information describing the video clips may be stored in clip metadata 152. In some examples, clip metadata 152 may also include an identification or other indication of a streamer, game title, and other information about the stream from which each respective video clip is created, as well as potentially information about the streamer (e.g., number of viewers, channel identifier, etc.) and game title (e.g., publisher, level, etc.). Clip metadata 152 may also include information such as a start time and/or end time of the video clip, a clip duration, a time and/or date when the clip was made, information about the viewer that created the clip, and other information.

As described above, in some examples, certain clips in clip library 151 may be particularly desirable for viewers. For example, in some cases, the most frequently viewed and shared video clips may be desirable, as the frequent viewing and sharing of these clips suggests that they include video that is enjoyable and/or interesting to large numbers of viewers. However, it is currently difficult for clip viewers to determine which clips are the most desirable to view. In particular, video streaming service 120 may sometimes transmit large quantities of video streams, each with large quantities of respective stream clips, thereby creating a large pool of available stream clips. Thus, to help viewers find desirable clips and for other reasons, clip services 150 may compute popularity measures 154 for the available clips in the clip library 151. Each popularity measure 154 may indicate a respective popularity of a corresponding video clip. For example, in some cases, the popularity measures may include popularity scores that are a function of, or otherwise related to, popularity, such as with more popular clips having higher scores and less popular clips having lower scores.

The popularity measures 154 may be determined based, at least in part, on tracked action data 153. In some examples, the video streaming service 120 may track various actions associated with each video clip. The tracked actions may include actions such as playing of a video clip, sharing of a video clip, submission of comments (including text, chat, audio, icons, graphics, emotes, likes, etc.) associated with the video clip, and the like. The tracked action data 153 may include data indicative of the tracked actions and associated information, such as times at which the actions occurred, associated users, related actions or events, and the like. The tracked action data 153 may then be used to determine the popularity measures 154. For example, in some cases, a popularity measure may be determined based at least in part on a frequency (i.e., amount divided by time) with which a respective video clip is played and/or shared within one or more time periods, such as a previous hour, day or week. Also, in some examples, a popularity measure may be determined based at least in part on an amount and/or frequency of comments submitted in association with a respective video clip. Furthermore, in some examples, a popularity measure may be determined based on actions of viewers that watch video clips. For example, if a viewer watches a video clip and then subsequently purchases a copy of the game title from which the video clip is taken, such as within a specified time period after watching the video clip, then this may increase the popularity score for that video clip, for example because it indicates that the video clip showed the video game in a favorable manner. In yet other examples, the tracked action data 153 may include indications of how frequently video clips are made or extracted from other video clips. For example, in some cases, one or more secondary video clips may be made that include various portions of a single primary video clip from which they are extracted. The making of these secondary video clips from the primary video clip may indicate that the primary video clip has become popular among viewers—and may therefore increase a popularity score for the primary video clip. Also, in some examples, when secondary video clips are made from a primary video clip, the secondary video clips may potentially inherit the popularity score and/or other context data from the primary video clip from which they are created.

In some examples, in addition to tracked action data 153, the popularity measures 154 may also be based on other factors, such as a quantity of viewers or other characteristics of a streamer that provided the video stream from which the video clip was generated. Moreover, in some examples, popularity measures may be weighted, for example to give priority (e.g., a higher score) to clips that have certain desired characteristics, such as clips that show certain game titles and/or game features, clips show certain features of the video streaming service (e.g. technical features/options that the video streaming service wishes to publicize or raise awareness of), and the like. The popularity measures 154 may be used to select and provide video clips to viewers. In some examples, video clips may also be selected for viewers based on other factors, such as information that may be stored in clip metadata 152. For example, in some cases, video clips may be selected for viewers based on contents and/or characteristics of the video clips, such as may be determined from keywords, a representative thumbnail image, and/or other information that may be stored in clip metadata 152. Also, in some examples, emotions and or contexts of a video clip may be determined based on other information, such as chat, emotes and other comments associated with the video clip, the representative thumbnail image, and the like. This information may be matched to desired emotions or contexts that a user may specify, such as when requesting or searching for desired video clips. Additionally, in some cases, video clip requestors may specify preferred game titles and/or streamers from which to provide video clips, and clip metadata 152 may store information about the streamers and game titles associated with stored clips as described above.

Figure 2:
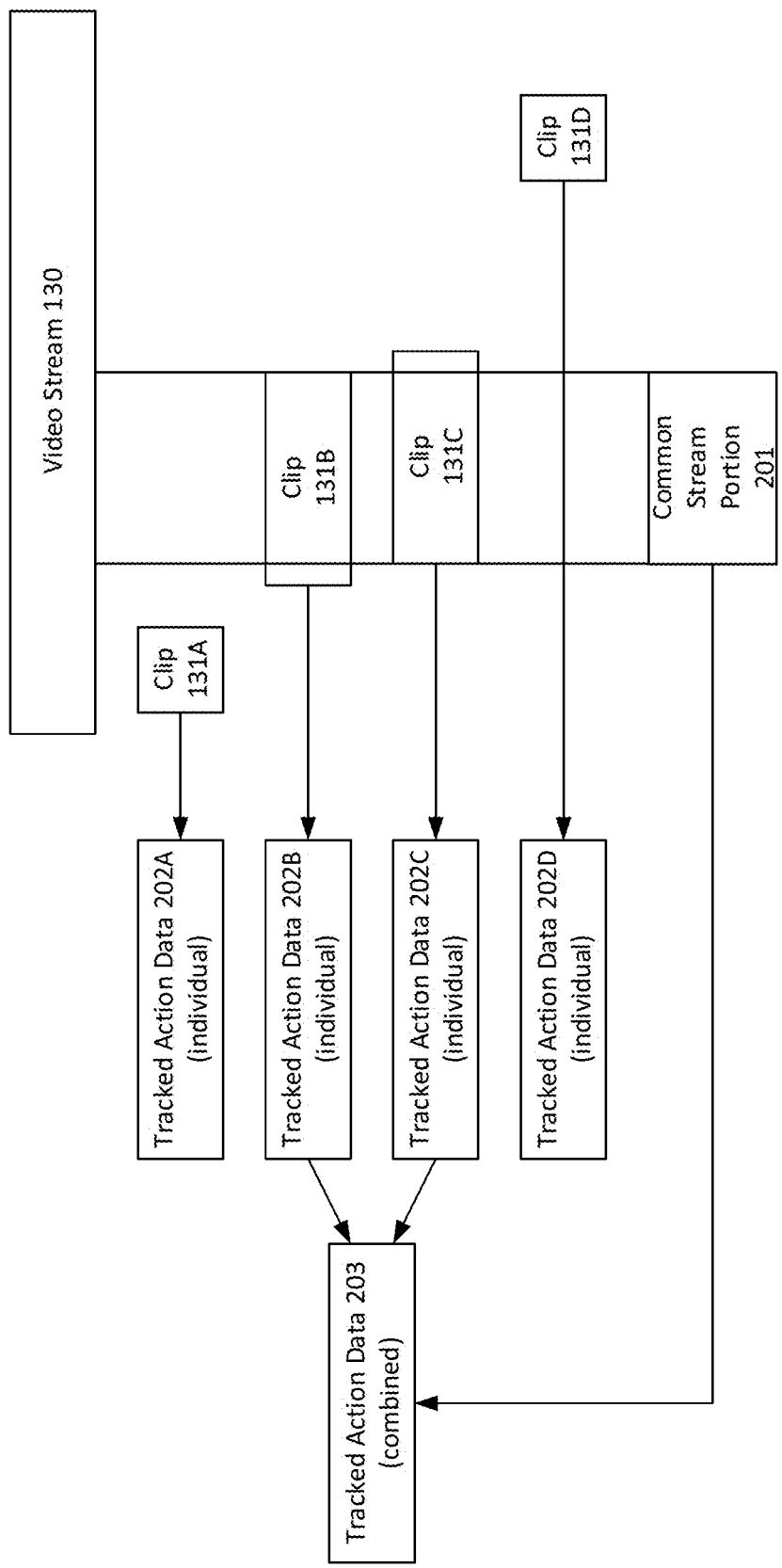
FIG. 2 is diagram illustrating example video clip tracked action data that may be used in accordance with the present disclosure.

Referring now to FIG. 2, it is seen that, in some examples, some video clips may wholly or partially overlap one another. For example, as shown in FIG. 2, video clips 131B and 131C partially overlap one another such that they include a common stream portion 201 of the video stream 130. In some cases, when it is determined that two or more clips overlap one another, such as video clips 131B and 131C, the collected data (e.g., tracked action data 153, clip metadata 152, etc.) associated with those clips may be merged or otherwise combined. In some examples, clip services 150 may determine when clips wholly or partially overlap one another based on their start times and end times, which may be relative to the timing of the video stream from which they are extracted, and which may be stored in clip metadata 152. In some examples, in order to combine the collected data for the clips, the clips may be required to overlap one another by at least a threshold amount and/or percentage of time, such as a percentage of the total time duration of each clip.

As shown in FIG. 2, individual clip tracked action data 202A-D may be collected for each individual clip 131A-D, respectively. However, upon determining that clips 131B and 131C substantially overlap one another, clip services 150 may combine the individual tracked action data 202B and 202C (corresponding to individual clips 131B and 131C, respectively) into combined tracked action data 203 corresponding to both clips 131B and 131C. In some specific examples, viewership data (e.g., quantity and/or frequency of views) indicating higher viewership may be attributed to overlapping video clips with lower viewership. For example, suppose that the clip 131B has received ten-thousand views in the last hour, while the clip 131C has received only five views in the last hour. In this scenario, because clips 131B and 131C include substantially the same content (i.e., common stream portion 201), it may be presumed that the low frequency of the viewing of the clip 131C (in comparison to the much higher frequency of the viewing of the clip 131B) is primarily due merely to a lack of awareness or publicity of clip 131C in the viewing community. Thus, in some examples, although clip 131C did not have high viewership, the viewership data for clips 131B and 131C may be merged such that the higher viewership of clip 131B is also attributed to clip 131C, thereby potentially resulting in a much higher popularity score for clip 131C than if its tracked action data 202C had not been merged with tracked action data 202B for clip 131B. Also, in some examples, other data regarding clips 131B and 131C may also be merged, such as keywords and other emotion or context data, chat, emote and other comment data, other clip metadata 152, and the like.

Figure 3:
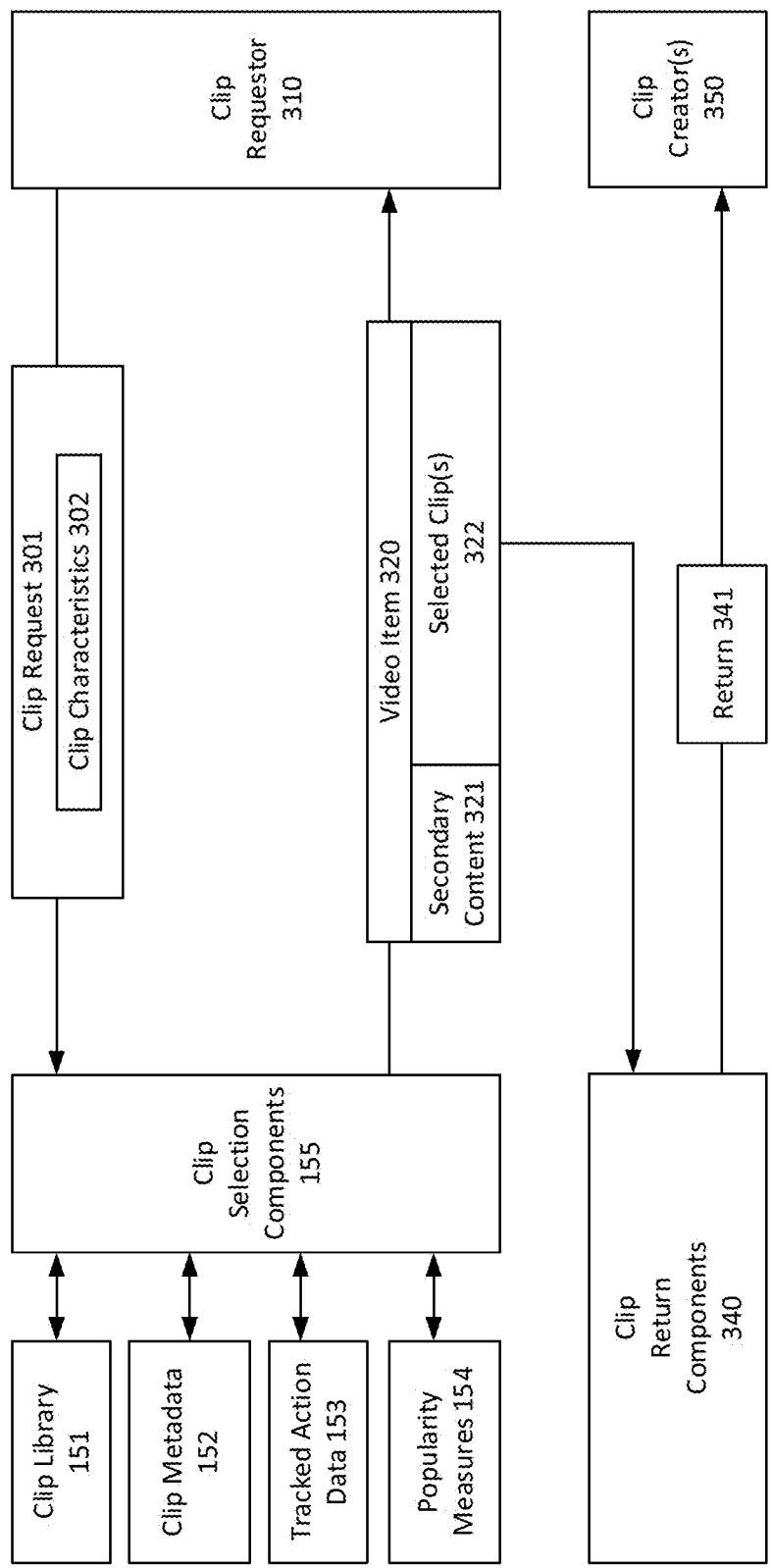
FIG. 3 is a diagram illustrating an example video clip request and selection that may be used in accordance with the present disclosure.

Thus, as described above, popularity measures 154, clip metadata 152, tracked action data 153 and other information may be used to select clips from clip library 151 that may be of interest to various viewers. Referring now to FIG. 3, an example is shown in which a clip requestor 310 sends a clip request 301 to clip selection components 155 of clip services 150. In some examples, the clip request 301 may indicate one or more clip characteristics 302 of a desired clip that the clip requestor wishes to obtain. As described above, in some examples, the clip characteristics 302 may include a preferred streamer, game title, level, game type, contexts (e.g., happy, sad, exciting, dangerous, attractive, calm, violent, expert, winning, losing, turning point, and the like), popularity score, minimum amount and/or frequency of views, date or time range, and many other characteristics. Upon receiving the clip request 301, clip selection components 155 may recommend or otherwise select one or more selected clip(s) 322 from clip library 151 that match the characteristics 302. In some examples, clip selection components may perform this selection based at least in part on popularity measures 154, clip metadata 152, and tracked action data 153, such as using any combination of the techniques described in detail above. As should be appreciated, any number of different techniques may be employed to perform this selection, such as selecting one or more clips with a highest popularity measure 154 that match one or more of the clip characteristics 302, by weighting one or more of the popularity measures 154 as described above, and/or using any combinations of these or other techniques.

Upon selecting the selected clip(s) 322, the clip selection components 155 may provide one or more video items that include the selected clip(s) 322. In the example of FIG. 3, the selected clip(s) 322 are included in a single video item 320. However, in some cases, selected clips may be distributed across multiple video items and/or may be combined into a single video item in response to clip request 301. In some cases, video item 320 may include a daily, weekly or other highlight reel of popular video clips for a particular streamer and/or game title, in some cases tailored to particular emotions or other contexts that may be desired by clip requestor 310. In this example, in addition to video clip(s) 322, video item 320 also includes secondary content 321, such as advertisements, notifications and the like, thereby providing additional incentive to the streaming service to provide the video item 320 to clip requestor 310. In the example of FIG. 3, clip return components 340, such as may be operated by video streaming service 120 and/or other parties, may track the viewing of video items to provide returns (e.g., rewards, recognitions, etc.) to clip creators based on the viewing of the video items. In this example, when video item 320 is viewed by clip requestor 310, one or more clip creator(s) 350 of the selected video clip(s) 322 that are included in video item 320 may receive a return 341 from the clip return components 340. This may provide a further incentive for clip creators to benefit from generation of video clips. In some examples, the selected clip(s) 322 may include video that is included in two or more overlapping clips (such as clips 131B and 131C of FIG. 2). For example, the selected clip(s) 322 could include a clip that includes common stream portion 201 of FIG. 2, which is included in both clip 131B and clip 131C. In this scenario, the return 341 may be allocated to the creator of clip 131B and clip 131C (if they are made by different creators) in a variety of different ways. For example, the creator of clip 131B and the creator of clip 131C may each receive a separate return 341—or a single return 341 may potentially be split or shared between the creator of clip 131B and the creator of clip 131C, such as evenly split or according to another selected distribution.

Figure 4:
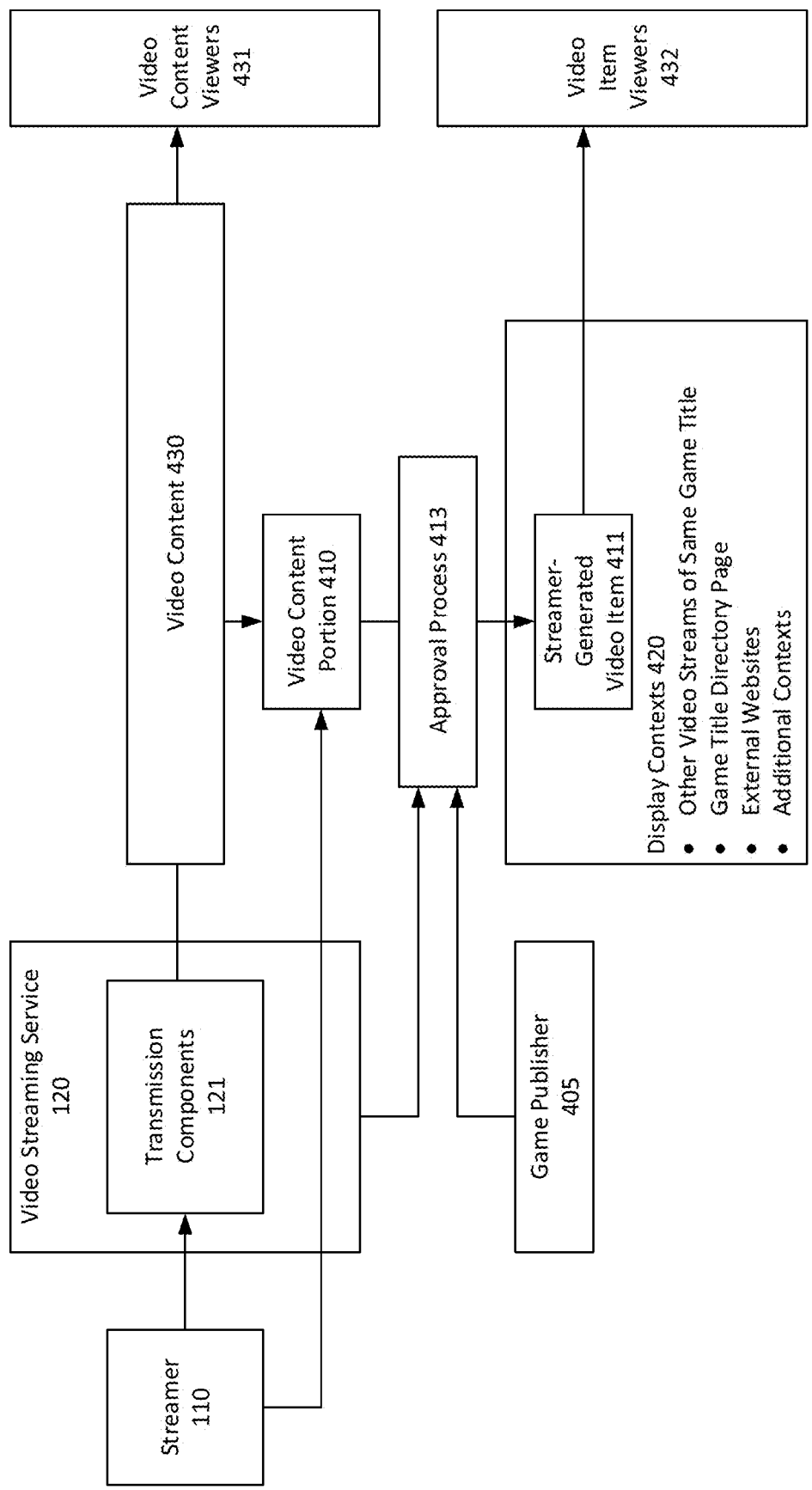
FIG. 4 is a diagram illustrating an example streamer-generated video item creation system that may be used in accordance with the present disclosure.

Thus, as described above with reference to FIGS. 1-3, video clips may be generated by stream viewers and may be included in video items that are provided to other viewers based on a popularity measure and/or various other factors. As also described herein, in some examples, video items may be generated by streamers, such as may include selected portions of video of streamers playing particular game titles. Referring now to FIGS. 4-6, some examples of streamer-generated video items will now be described in detail. Specifically, as shown in FIG. 4, a streamer 110 may provide video content 430 to video content viewers 431 via video streaming service 120. In the example of FIG. 4, video content 430 is transmitted from streamer 110 to video streaming service 120 and in turn, from video streaming service 120 to video content viewers 431 over one or more communications networks, for example one or more local area networks (LAN's) and/or one or more wide area networks (WAN's), such as the Internet. Additionally, video content 430 may be transmitted from streamer 110 to video streaming service 120 and, in turn, from video streaming service 120 to video content viewers 431 using streaming transmission techniques.

In some examples, streamer 110 may be a video game player and may participate in a first video game session for a particular game title. Video content 430 may include captured and recorded video of the first video game session. In some examples, in addition to only game video, the video content 430 may include or be combined with video of streamer 110, such as video of the streamer's face while participating in the first game session, as well as corresponding game audio, audio of the streamer speaking and commenting on game action, and other additional video and audio. In some examples, the streamer's participation in the first video game session may be part of a campaign or program where the streamer is incentivized to play the particular game title in order to generate publicity and interest in the particular game title.

As shown in FIG. 4, upon completion of the first video game session, streamer 110 may select a desired video content portion 410 (e.g., 5, 15 or 30 second portions or other durations) from the video content 430 of the first video game session for inclusion in a streamer-generated video item 411. In some examples, the streamer may select the video content portion 410 from the video content 430 based on the popularity measures described above, such as by selecting a portion of the video content 430 that is included in a clip with a high popularity score. The high popularity score of such a clip may suggest that the respective portion of the video content includes video that is interesting and exciting to viewers. In some examples, upon selection of the video content portion 410 by the streamer 110, the video content portion 410 may pass through an approval process 413, such as whereby a game publisher 405 of the video game title, the video streaming service 120, and potentially other entities may be permitted to review and approve or reject the video content portion 410, such as to allow these entities to ensure brand safety and for other reasons. The selected video content portion 410 may then be included in the streamer-generated video item 411. In some examples, in addition to the selected video content portion 410, the streamer-generated video item may include other data or content, such as advertisements, notifications, and the like.

The streamer-generated video item 411 may be provided to video item viewers 432, such as through various display contexts 420. For example, the video item may be played to viewers in association with (e.g., as a pre-roll and/or post-roll) other video streams of other streamers playing the same game title that is included in the streamer-generated video item 411. As another example, the streamer-generated video item 411 may be included in a directory page for the game title that may be provided by the video streaming service 120. As yet another example, the video item may be played on selected external (i.e., non-video streaming service) websites. As should be appreciated, any combinations of these and/or other display contexts may be employed.

Figure 5A:
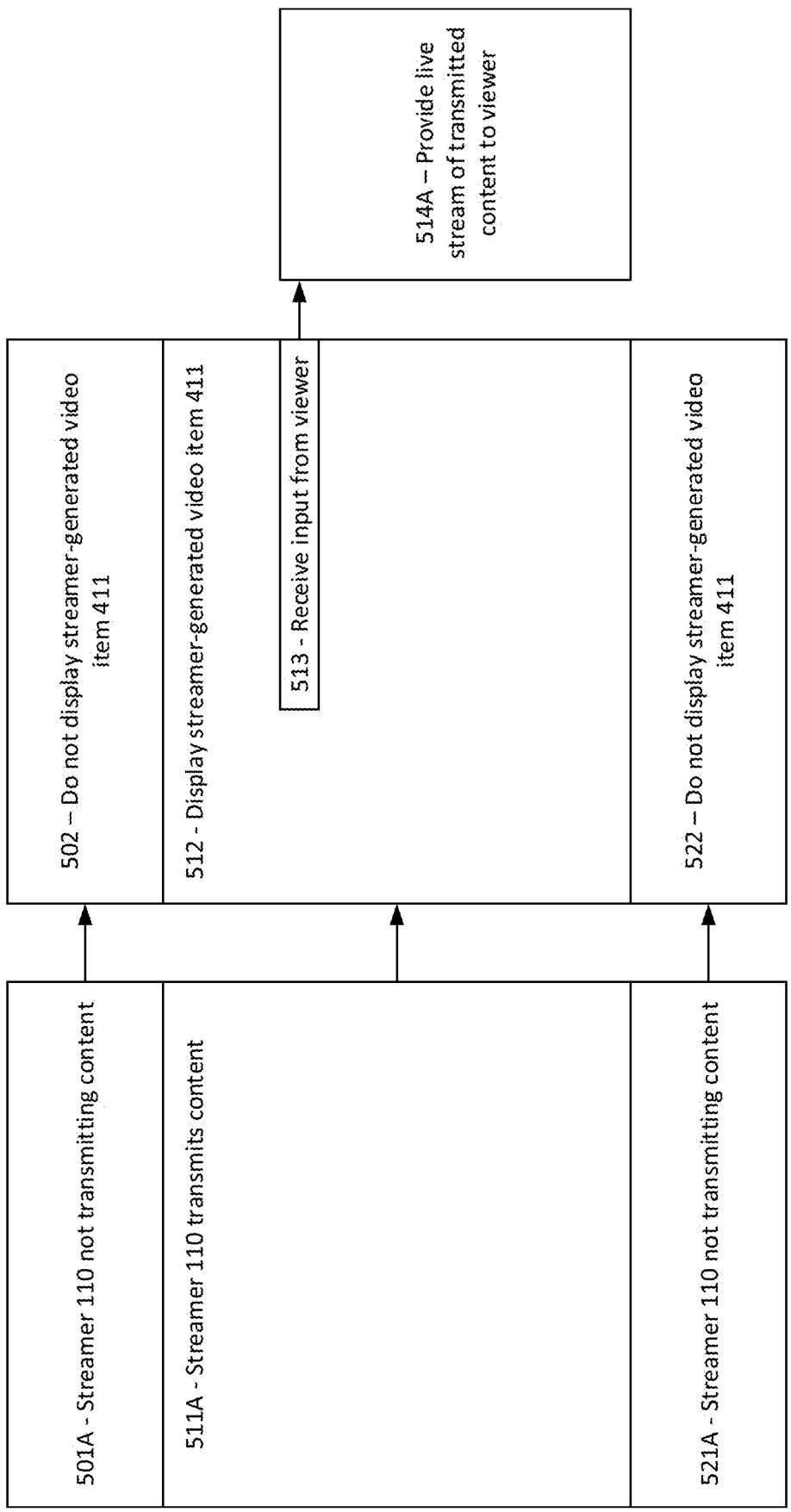
Figure 6:
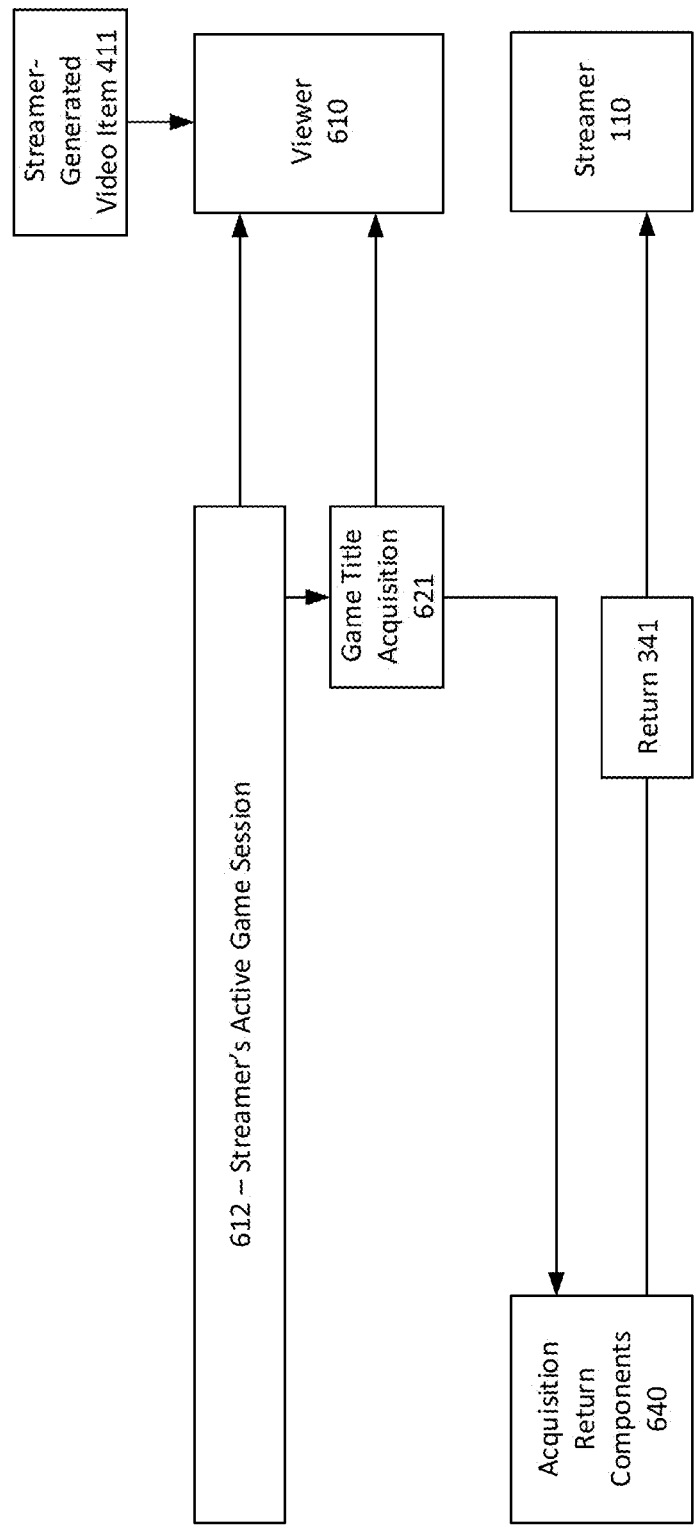
FIG. 6 is a diagram illustrating an example game title acquisition from a streamer's active game session that may be used in accordance with the present disclosure.

Referring now to FIGS. 5A-5B, some examples of intelligent timing control for streamer-generated video item 411 will now be described in detail. In particular, in some examples, streamer-generated video item 411, which is generated by streamer 110, may be displayed to video item viewers 432 only during times when streamer 110 is transmitting content, such as when the streamer is actively transmitting video game content or potentially other content (e.g. music, other video and/or audio content, etc.). In the example of FIG. 5A, it is seen that, during a time period 501A, streamer 110 is not transmitting content. As shown, display status 502 indicates that, during time period 501A, streamer-generated video item 411 is not displayed to viewers. By contrast, during a subsequent time period 511A, streamer 110 transmits content (e.g., video game content, music, other video and/or audio content, etc.), such as may be transmitted from the streamer to the video streaming service 120 and, in turn, to one or more viewers. As shown, display status 512 indicates that, during time period 511A, streamer-generated video item 411 is displayed to one or more viewers, such as via any of the example display contexts 420 described in detail above. Subsequently, during a later time period 521A, streamer 110 ceases to transmit the content. As shown, display status 522 indicates that, during time period 521A, streamer-generated video item 411 is not displayed to viewers.

In some examples, as a further refinement of the intelligent timing control described herein, streamer-generated video item 411 may be displayed to video item viewers 432 only during times when streamer 110 is participating in an active game session of the same video game title that is included in the streamer-generated video item 411. In the example of FIG. 5B, it is seen that, during a time period 501B, streamer 511 is not participating in an active game session of the same video game title that is included in the streamer-generated video item 411. As shown, display status 502 indicates that, during time period 501B, streamer-generated video item 411 is not displayed to viewers. By contrast, during a subsequent time period 511B, streamer 110 joins and participates in an active game session of the same video game title that is included in the streamer-generated video item 411, such as may be transmitted via video streaming service 120. As shown, display status 512 indicates that, during time period 511B, streamer-generated video item 411 is displayed to one or more viewers, such as via any of the example display contexts 420 described in detail above. Subsequently, during a later time period 521B, streamer 110 disconnects from the active game session and is no longer participating in any active game sessions of the same video game title that is included in the streamer-generated video item 411. As shown, display status 522 indicates that, during time period 521B, streamer-generated video item 411 is not displayed to viewers.

Additionally, in some examples, a viewer of the streamer-generated video item 411 may provide input (e.g. right-click, etc.) that allows the viewer to receive a live stream of the streamer's active game session or other transmitted content that it is being played simultaneously with the display of the streamer-generated video item 411. For example, the video item may be displayed in combination with a control that receives a viewer's input and responsively triggers transmission of the live stream of the streamer's active game session or other transmitted content to the viewer. As shown in both FIGS. 5A and 5B, at a time 513 during the display of the streamer generated video item 411, input may be received from the viewer to request a live stream of the streamer's active game session. Responsive to this input, video streaming service 120 may provide a live stream of the streamer's transmitted content (during time period 514A of FIG. 5A) or a live stream of the streamer's active game session (during time period 514B of FIG. 5B) to the viewer. Thus, by allowing viewers to access a live stream of the streamer 110, the streamer-generated video item 411 may allow efficient targeting and linkage of viewers with streamer 110 and the game title or other content being played therein. This may benefit viewers, such as by allowing viewers to easily discover additional streamers and/or game titles that may be of interest to the viewers. Additionally, this may benefit streamers, such as by allowing streamers to build their fan bases and attract larger amounts of viewers. Furthermore, this may benefit game publishers, such as by allowing game publishers to gain additional exposure and publicity for their games. Also, this may benefit the video streaming service 120, such as by allowing the video streaming service 120 to raise awareness of streamers and game titles carried by the service and to potentially gain a return from game publishers in exchange for showing streamer-generated video items that showcase their games. Moreover, by showing streamer-generated video items only when respective streamers are actively streaming a live game session, the video items are intelligently targeted to live streamers, thereby enhancing the level of interaction between viewers and the streamers to which they are introduced and linked.

Referring now to FIG. 6, some examples of game title acquisition from a streamer's active game session will now be described in detail. In particular, in some examples, when a viewer is linked to a streamer's live stream via a streamer-generated video item, the streamer may be given a return when the viewer acquires an executable instance of the video game title that is shown in the streamer-generated video item and the live stream to which the viewer is linked. For example, as shown in FIG. 6, a viewer 610 may be linked to a streamer's active game session 612 via streamer-generated video item 411 as described above. At some point during the transmission of the streamer's active game session 612, a game title acquisition 621 occurs, whereby the viewer 610 acquires an executable instance of the video game title that is shown in the streamer-generated video item 411 and the streamer's active game session 612. For example, a stream of the streamer's active game session 612 may be displayed in combination with a control that allows the viewer 610 to acquire the game title, such as by linking the viewer to a purchase page for the game title. In this example, a notification of the game title acquisition 621 may be provided to acquisition return components 640, which, in turn, provide a return 341 to the streamer 110, such as a reward or recognition from the video streaming service 120. In this way, the streamer 110 may be further incentivized to create streamer-generated video items and to play and publicize a game title. In the particular example of FIG. 6, game title acquisition 621 occurs during the streamer's active game session 612. In other examples, however, the viewer's acquisition of a game title may be tied to the streamer 110 in other ways, such as by acquiring the game title within a specified time period after the streamer's active game session 612 ends, by having the viewer 610 enter an identifier or promotional code associated with the streamer 110 when acquiring the game title, or in other ways.

Figure 7:
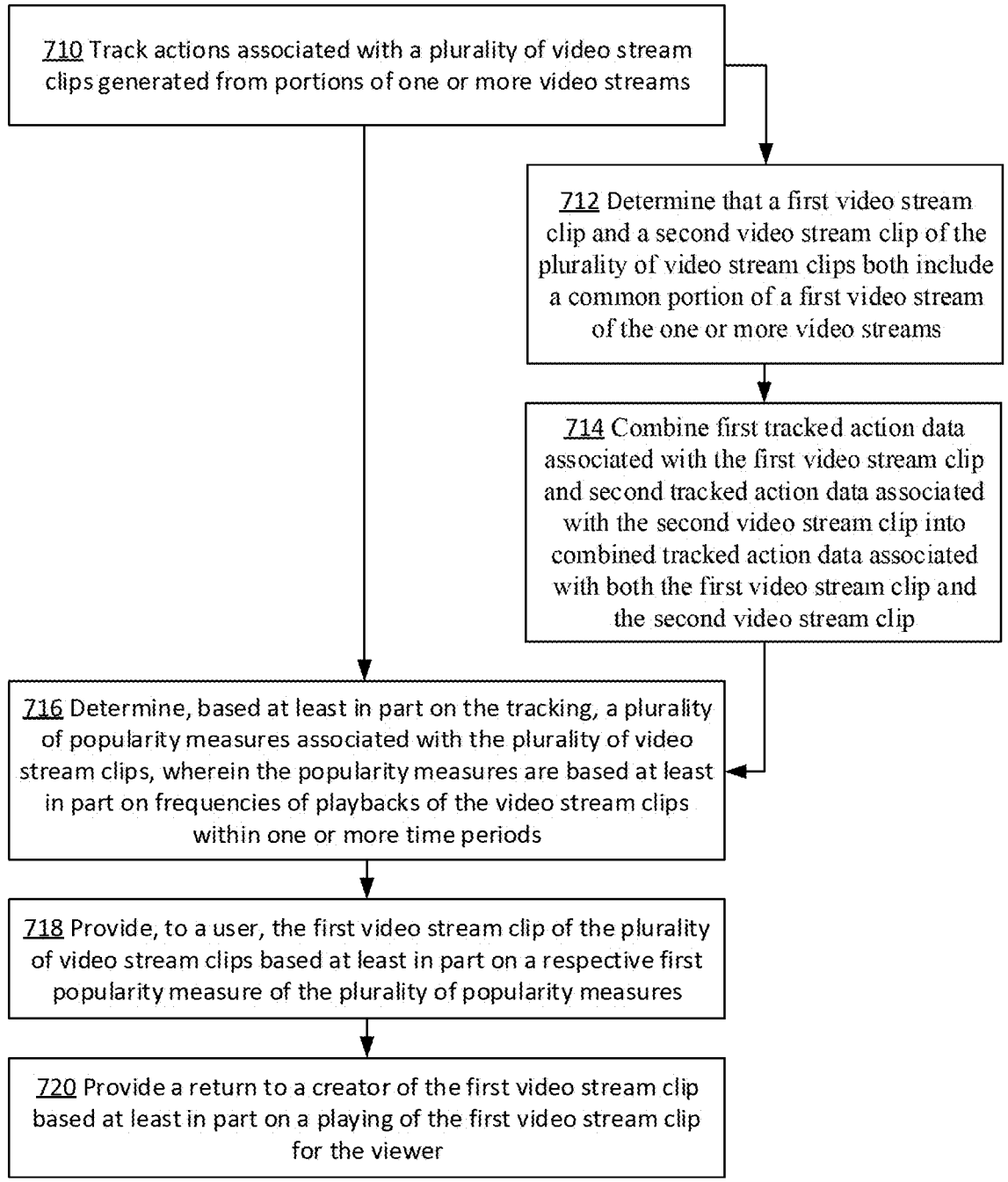
FIG. 7 is a flowchart illustrating an example process for control of viewer-generated stream clips that may be used in accordance with the present disclosure.

Referring now to FIG. 7, an example process for control of viewer-generated stream clips will now be described in detail. In particular, the process of FIG. 7 is initiated at operation 710, at which actions associated with a plurality of video stream clips generated from portions of one or more video streams are tracked. As described above, the one or more video streams may be transmitted to viewers over one or more communications networks, and the video stream clips may be generated and created by the viewers of the streams. The one or more video streams may include video of one or more video game sessions played by a streamer. The tracked actions may include actions such as playing of a video stream clip, and the tracking may therefore include determining occurrences of playbacks of the video stream clips. The tracked actions may include actions such as sharing of a video clip, submission of comments (including text, chat, audio, icons, graphics, emotes, likes, etc.) associated with the video clip, and the like. The video streaming service may collect and store data indicative of the tracked actions and associated information, such as times at which the actions occurred, associated users, related actions or events, and the like. The video streaming service may also collect and store other data regarding the video clips, such as start and end time data, data about the streamers that provide the streams from which the clips are extracted, data about contents of comments, keywords and other information indicative of contents of the video clips, and the like.

As described in detail above, such as with reference to FIG. 2, some video clips may overlap one another by including a common portion of a video stream from which they are extracted. Operations 712 and 714 are operations that may optionally be performed for these overlapping video clips. In particular, at operation 712, it is determined that a first video stream clip and a second video stream clip of the plurality of video stream clips both include a common portion of a first video stream of the one or more video streams. For example, as described above, timing data regarding start times, end times and/or durations of video stream clips may be collected and stored. In some examples, these start times, end times and other timing data may be relative to a frame number, elapsed duration, or other timing information for a stream from which the clips are extracted. The collected and stored timing data for the video stream clips, such as start times and end times, may be used to determine when two or more video clips overlap one another by including a common portion of a video stream from which they are extracted.

At operation 714, first tracked action data associated with the first video stream clip and second tracked action data associated with the second video stream clip are combined into combined tracked action data associated with both the first video stream clip and the second video stream clip. For example, in some cases, the first video stream clip may have a first amount of tracked views and the second video stream clip may have a second amount of tracked views that is higher than the first amount of tracked views, and the combining performed at operation 714 may include attributing the second amount of tracked views to the first video stream. Some specific examples of this and other combinations are described in detail above with respect to FIG. 2 and are not repeated here. In addition to tracked action data, other data for overlapping video clips may also be combined, such as contents of comments, keywords, other context data, and the like.

At operation 716, a plurality of popularity measures associated with the plurality of video stream clips are determined based at least in part on the tracking of operation 710. For example, for cases in which a first video clip overlaps with a second video clip, a popularity measure corresponding to the first video clip may be determined based at least in part on the combined tracked action data (e.g., as in the examples of operations 712 and 714). By contrast, in some cases where a first video clip does not overlap with other video clips, a popularity measure for the first video clip may be based on tracked action data for only the first video clip. In some examples, the popularity measures may be based at least in part on amounts and/or frequencies of playbacks of the video stream clips within one or more time periods, such as a previous hour, day or week. Also, in some examples, the popularity measures may be based at least in part on amounts of occurrences of sharing of the plurality of video stream clips, amounts of viewers of streamers that provide the plurality of video clips, or amounts of comments associated with the plurality of video clips. Moreover, in some examples, popularity measures may be weighted, for example to give priority (e.g., a higher score) to clips that have certain desired characteristics, such as clips that show certain game titles and/or game features, clips show certain features of the video streaming service (e.g. technical features/options that the video streaming service wishes to publicize or raise awareness of), and the like.

At operation 718, the first video stream clip of the plurality of video stream clips is provided, to a user, based at least in part on a respective first popularity measure of the plurality of popularity measures. For example, in some cases the first video stream clip may be provided to the user because it has a high or highest popularity score and/or is above a threshold popularity score. Also, in some examples, the first video stream clip may be provided to the user because it has a highest popularity score among video stream clips that match certain criteria or characteristics specified by the user. For example, in some cases, video clip requestors may specify preferred game titles and/or streamers from which to provide video clips. Also, in some examples, the first video stream clip may be provided to the user based in part on contents of at least one of comments or keywords associated with the first video stream clip, such as may be used to determine emotions or contexts of the first video clip. These emotions or contexts may be matched to desired emotions or contexts that a user may specify, such as when requesting or searching for desired video clips.

At operation 720, a return (e.g., reward, etc.) is provided to a creator of the first video stream clip based at least in part on a playing of the first video stream clip. For example, as described above, both the first video stream clip and secondary video content (e.g., advertising, etc.) may be inserted into a video item, and the providing of the first video stream clip to the user at operation 718 may include providing the video item to the user. A return may then be provided to a creator of the first video stream clip when the video item including the first vide stream clip is played for the viewer. Additionally, in some example, the video item may include a combination of multiple video stream clips from multiple different clip creators (e.g., a highlight reel), and the return may in some cases be split between the multiple different clip creators when the video item is played for the viewer.

Figure 8:
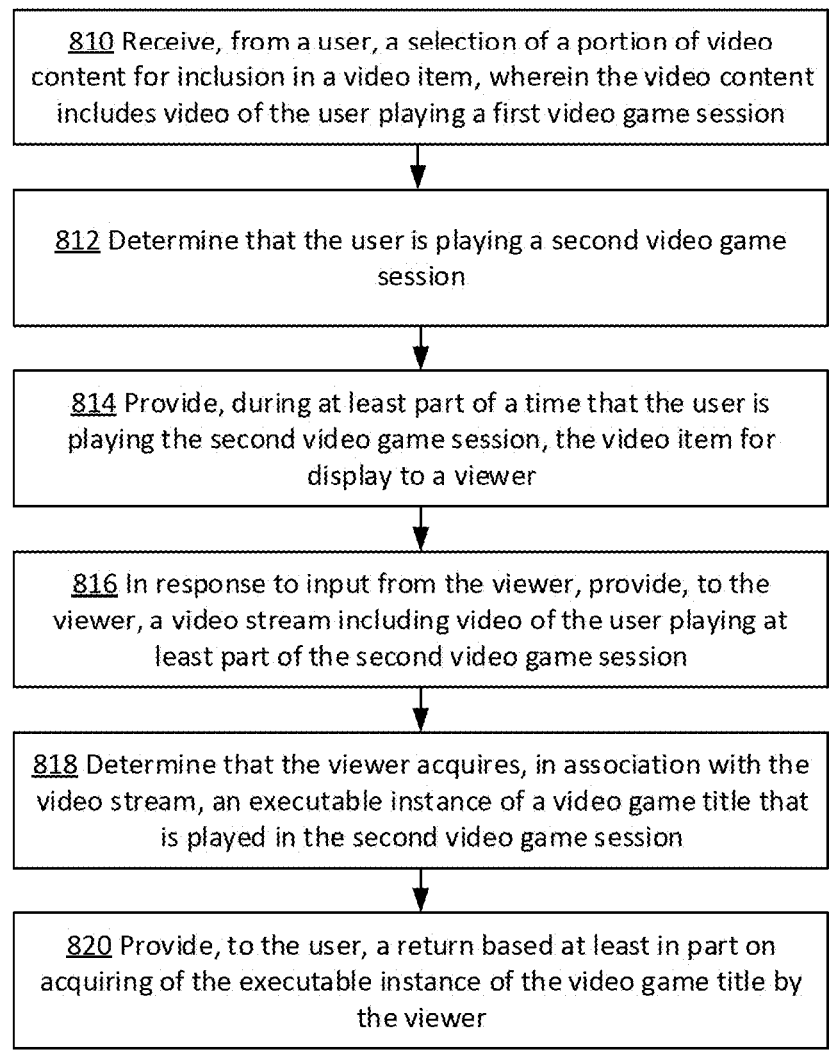
FIG. 8 is a flowchart illustrating an example process for control of streamer-generated video items that may be used in accordance with the present disclosure.

Referring now to FIG. 8, an example process for control of streamer-generated video items will now be described in detail. The process of FIG. 8 is initiated at operation 810, at which a selection of a portion of video content for inclusion in a video item is received from a user, such as streamer 110 of FIG. 4. For example, as shown in FIG. 4, streamer 110 may select video content portion 410 from video content 430, and this selection may be received by the video streaming service 120. As described above, the video content includes video of the user playing a first video game session. In some examples, in addition to only game video, the video content may include or be combined with video of the streamer, such as video of the streamer's face while participating in the first game session, as well as corresponding game audio, audio of the streamer speaking and commenting on game action, and other additional video and audio. In some examples, the portion of the video content for inclusion in the video item may be selected based at least in part on a quantity of times that one or more video clips that include the portion are played. For example, as described above, frequent playing of a video clip may result in a high popularity score for the video clip, which may indicate to a streamer that a portion of video content that includes the video clip may be interesting or exciting for viewers. In some examples, the portion of video content may be approved by a publisher of a video game title played in the first video game session and/or a streaming service that streams the video content.

At operation 812, it is determined that the user is playing a second video game session. For example, the streamer 110 may provide a video stream of the second video game session to the video streaming service 120 for transmission to subscribers of the video streaming service 120. Video streaming service 120 may, therefore, determine that the streamer is playing a second video game session based on receiving and transmitting the video stream of the second video game session. In some cases, operation 812 may include determining that the user is playing any video game session regardless of game title. As a further refinement, in some cases, operation 812 may include determining that the user is playing a video game session of a same video game title that is played in the first video game session, for example as described above with reference to FIG. 5B. Moreover, in some examples, the streamer's participation in the second game session may be detected dynamically by the video streaming service at operation 812, thereby allowing the streamer the flexibility to start and stop playing at any time and not requiring that the streamer to play only in specific reserved or other pre-arranged time periods.

At operation 814, the video item is provided for display to a viewer during at least part of a time that the user is playing the second video game session. For example, as shown in FIG. 4, the video item may be displayed in various display contexts. In some examples, operation 814 may include playing the video item in association with another video stream of a same game title that is played in the first video game session (e.g., as a pre-roll or post-roll) or playing the video item on a directory page of the same game title that is played in the first video game session. Additionally, in some examples, operation 814 may include playing the video item on an external (i.e., non-video streaming service) website or in other display contexts.

At operation 816, a video stream including video of the user playing at least part of the second video game session is provided to the viewer in response to input from the viewer. As described above, in some examples, the input from the viewer may include input provided via the video item. For example, the video item may be displayed in combination with a control that receives a viewer's input (e.g., right-click, etc.) and responsively triggers transmission of the live stream of the streamer's active game session to the viewer.

At operation 818, it is determined that the viewer acquires, in association with the video stream, an executable instance of a video game title that is played in the second video game session. In some examples, the video stream may be displayed in combination with a control that allows the viewer to acquire the game title, such as by linking the viewer to a purchase page for the game title. In some cases, operation 818 may include determining that the viewer acquires the executable instance of the video game title that is played in the second video game session during playing of the video stream or within a selected time period after the playing of the video stream. Also, in some cases, operation 818 may include determining that the viewer provides an identifier or code associated with the user/streamer when acquiring the executable instance of the video game title. At operation 820, a return is provided to the user based at least in part on acquiring of the executable instance of the video game title by the viewer. For example, in some cases, the return may include a reward or recognition that is provided to a streamer and that serves as an additional incentive to create streamer-generated video items.

It is noted that, although FIG. 8 relates a scenario in which the streamer selects a portion of video content for inclusion in a video item, there may be some scenarios in which the streamer may select a portion of any type of content—and not necessarily only video or video game content. For example, the streamer may select portions of music or other audio and/or video content for inclusion in a content item. Additionally, such a content item need not necessarily be displayed only during times when the streamer is transmitting video game content. For example, a content item may be displayed during times when the streamer is transmitting music and other audio and/or video content (such as described above with respect to FIG. 5A). In these scenarios, operation 810 may include receiving, from a first user, a selection of a portion of first content for inclusion in a content item. Operation 812 may include determining that the first user is transmitting second content. Operation 814 may include providing, during at least part of a time that the first user is transmitting the second content, the content item for display to a second user. Operation 816 may include, in response to input from the second user, providing, to the second user, a content stream including at least part of the second content. These and other variations and examples may be employed as part of the techniques described herein.

Figure 9:
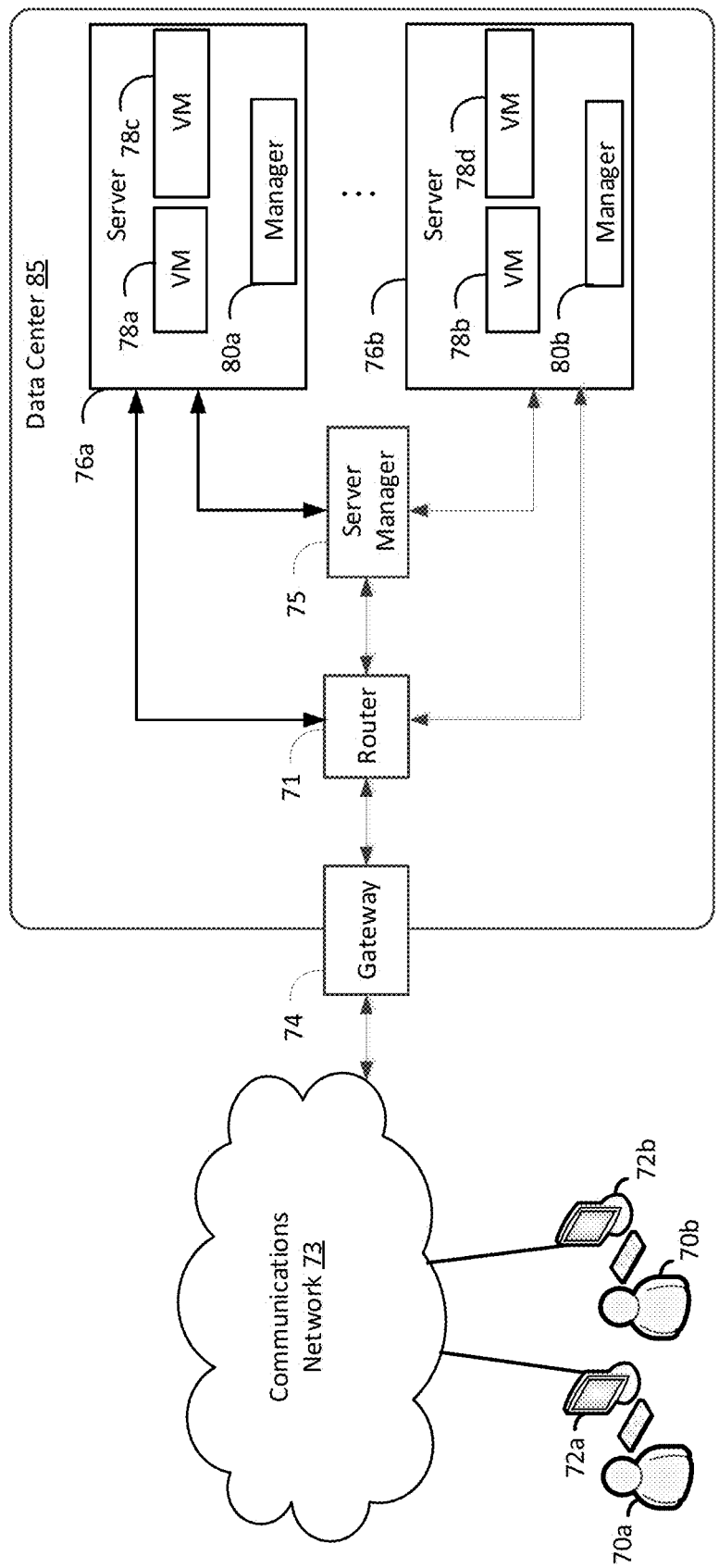
FIG. 9 is a diagram illustrating an example system for transmitting and providing data that may be used in accordance with the present disclosure.

An example system for transmitting and providing data will now be described in detail. In particular, FIG. 9 illustrates an example computing environment in which the embodiments described herein may be implemented. FIG. 9 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 9, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 9 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 9, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 9, a server manager 75 is also employed to at least in part direct various communications to, from and/or between servers 76a and 76b. While FIG. 9 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 9 has been greatly simplified and that many more networks and networking devices may be utilized to interconnect the various computing systems disclosed herein. These network topologies and devices should be apparent to those skilled in the art.

It should also be appreciated that data center 85 described in FIG. 9 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 10:
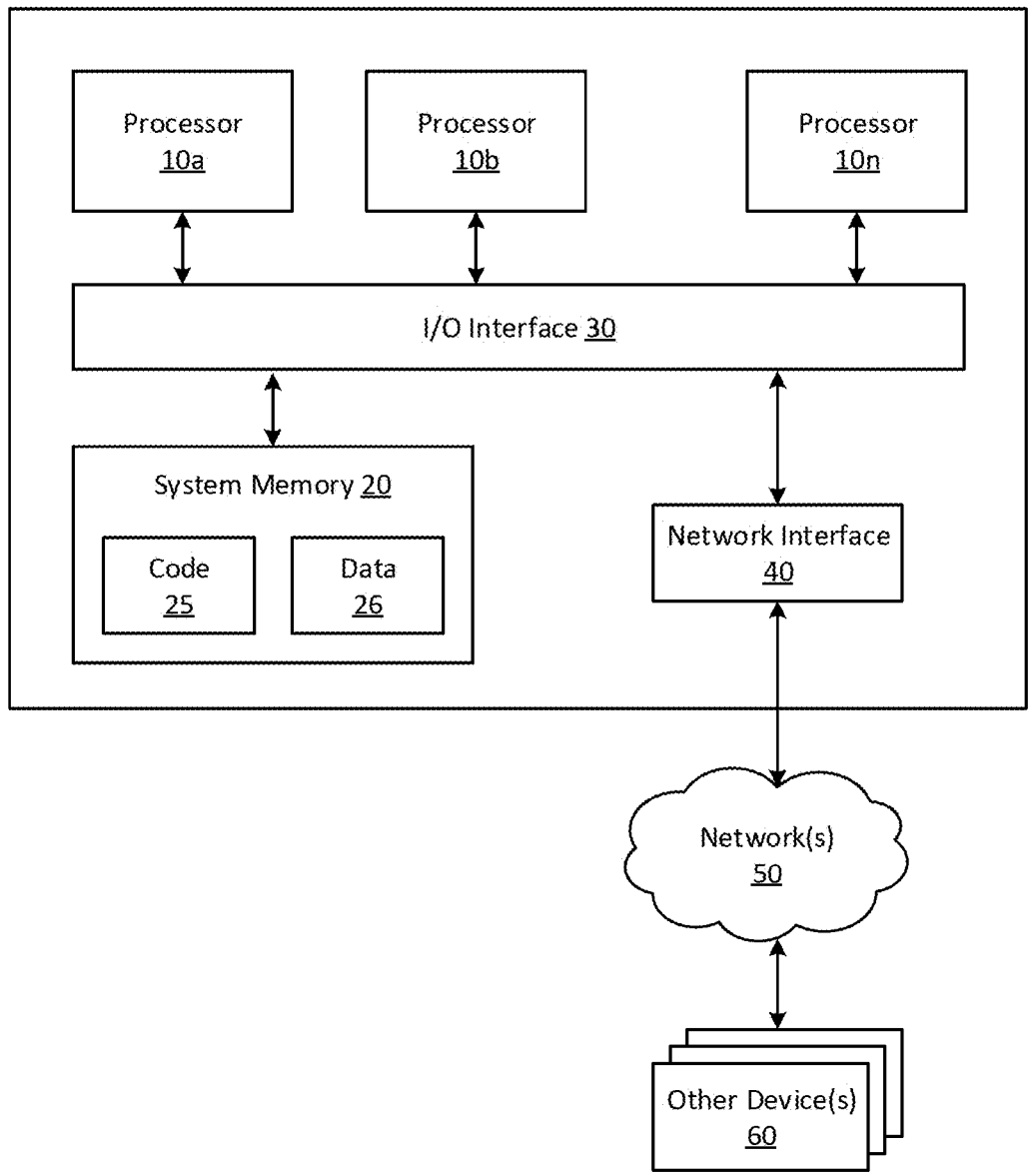
FIG. 10 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 10 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein instructions that, upon execution by the one or more processors, cause the computing system to perform operations comprising:
tracking actions associated with a plurality of video stream clips generated from portions of one or more video streams, wherein the one or more video streams are transmitted to viewers over one or more communications networks, wherein the plurality of video stream clips are generated by the viewers, and wherein the tracking comprises determining occurrences of playbacks of the plurality of video stream clips;
determining that a first video stream clip of the plurality of video stream clips and a second video stream clip of the plurality of video stream clips both include a common portion of a first video stream of the one or more video streams;
combining first tracked action data associated with the first video stream clip and second tracked action data associated with the second video stream clip into combined tracked action data associated with both the first video stream clip and the second video stream clip;
determining a popularity measure associated with the first video stream clip based at least in part on the combined tracked action data; and
providing, to a user, the first video stream clip based at least in part on the popularity measure.

2. The computing system of claim 1, wherein the first video stream clip has a first amount of tracked views and the second video stream clip has a second amount of tracked views that is higher than the first amount of tracked views, and wherein the combining comprises attributing the second amount of tracked views to the first video stream.

3. The computing system of claim 1, wherein the operations further comprise:
inserting both the first video stream clip and secondary video content into a video item, wherein the providing the first video stream clip to the user comprises providing the video item to the user.

4. The computing system of claim 1, wherein the one or more video streams include video of one or more video game sessions.

5. The computing system of claim 1, wherein the operations further comprise:
providing a return to a creator of the first video stream clip based at least in part on a playing of the first video stream clip.

6. The computing system of claim 1, wherein the first video stream clip is provided to the user based in part on contents of at least one of comments or keywords associated with the first video stream clip.

7. A computer-implemented method comprising:
tracking actions associated with a plurality of video stream clips generated from portions of one or more video streams, wherein the one or more video streams are transmitted to viewers over one or more communications networks, wherein the plurality of video stream clips are generated by the viewers, and wherein the tracking comprises determining occurrences of playbacks of the plurality of video stream clips;
determining that a first video stream clip of the plurality of video stream clips and a second video stream clip of the plurality of video stream clips both include a common portion of a first video stream of the one or more video streams;
combining first tracked action data associated with the first video stream clip and second tracked action data associated with the second video stream clip into combined tracked action data associated with both the first video stream clip and the second video stream clip;
determining a popularity measure associated with the first video stream clip based at least in part on the combined tracked action data; and
providing, to a user, the first video stream clip based at least in part on the popularity measure.

8. The computer-implemented method of claim 7, wherein the first video stream clip has a first amount of tracked views and the second video stream clip has a second amount of tracked views that is higher than the first amount of tracked views, and wherein the combining comprises attributing the second amount of tracked views to the first video stream.

9. The computer-implemented method of claim 7, further comprising:
inserting both the first video stream clip and secondary video content into a video item, wherein the providing the first video stream clip to the user comprises providing the video item to the user.

10. The computer-implemented method of claim 7, wherein the one or more video streams include video of one or more video game sessions.

11. The computer-implemented method of claim 7, further comprising:
providing a return to a creator of the first video stream clip based at least in part on a playing of the first video stream clip.

12. The computer-implemented method of claim 7, wherein the first video stream clip is provided to the user based in part on contents of at least one of comments or keywords associated with the first video stream clip.

13. One or more non-transitory computer-readable storage media having stored thereon instructions that, upon execution by a computing device, cause the computing device to perform operations comprising:
tracking actions associated with a plurality of video stream clips generated from portions of one or more video streams, wherein the one or more video streams are transmitted to viewers over one or more communications networks, wherein the plurality of video stream clips are generated by the viewers, and wherein the tracking comprises determining occurrences of playbacks of the plurality of video stream clips;
determining that a first video stream clip of the plurality of video stream clips and a second video stream clip of the plurality of video stream clips both include a common portion of a first video stream of the one or more video streams;
combining first tracked action data associated with the first video stream clip and second tracked action data associated with the second video stream clip into combined tracked action data associated with both the first video stream clip and the second video stream clip;
determining a popularity measure associated with the first video stream clip based at least in part on the combined tracked action data; and providing, to a user, the first video stream clip based at least in part on the popularity measure.

14. The one or more non-transitory computer-readable storage media of claim 13, wherein the first video stream clip has a first amount of tracked views and the second video stream clip has a second amount of tracked views that is higher than the first amount of tracked views, and wherein the combining comprises attributing the second amount of tracked views to the first video stream.

15. The one or more non-transitory computer-readable storage media of claim 13, wherein the operations further comprise:
    inserting both the first video stream clip and secondary video content into a video item, wherein the providing the first video stream clip to the user comprises providing the video item to the user.

16. The one or more non-transitory computer-readable storage media of claim 13, wherein the one or more video streams include video of one or more video game sessions.

17. The one or more non-transitory computer-readable storage media of claim 13, wherein the operations further comprise:
    providing a return to a creator of the first video stream clip based at least in part on a playing of the first video stream clip.

18. The one or more non-transitory computer-readable storage media of claim 13, wherein the first video stream clip is provided to the user based in part on contents of at least one of comments or keywords associated with the first video stream clip.

* * * * *